US010778702B1

(12) United States Patent
Huang et al.

(10) Patent No.: US 10,778,702 B1
(45) Date of Patent: Sep. 15, 2020

(54) PREDICTIVE MODELING OF DOMAIN NAMES USING WEB-LINKING CHARACTERISTICS

(71) Applicant: Anomali Inc., Redwood City, CA (US)

(72) Inventors: Wei Huang, Los Altos Hills, CA (US); Evan Wright, Pittsburgh, PA (US); Akshay Kumar, San Lorenzo, CA (US)

(73) Assignee: Anomali, Inc., Redwood City, CA (US)

( * ) Notice: Subject to any disclaimer, the term of this patent is extended or adjusted under 35 U.S.C. 154(b) by 208 days.

(21) Appl. No.: 15/965,787

(22) Filed: Apr. 27, 2018

Related U.S. Application Data

(60) Provisional application No. 62/505,805, filed on May 12, 2017.

(51) Int. Cl.
H04L 29/06 (2006.01)
H04L 29/12 (2006.01)
H04L 12/24 (2006.01)
G06F 16/28 (2019.01)
G06F 16/951 (2019.01)

(52) U.S. Cl.
CPC ........ H04L 63/1416 (2013.01); G06F 16/285 (2019.01); G06F 16/951 (2019.01); H04L 41/142 (2013.01); H04L 41/147 (2013.01); H04L 61/1511 (2013.01); H04L 63/1425 (2013.01)

(58) Field of Classification Search
None
See application file for complete search history.

(56) References Cited

U.S. PATENT DOCUMENTS

| | | | | |
|---|---|---|---|---|
| 9,043,894 B1* | 5/2015 | Dennison | ............ | H04L 63/1408 726/11 |
| 2012/0158626 A1* | 6/2012 | Zhu | ...................... | H04L 63/1408 706/13 |
| 2012/0215760 A1* | 8/2012 | Park | ...................... | G06F 16/951 707/709 |
| 2013/0036343 A1* | 2/2013 | Singhal | ............... | G06F 16/9577 715/205 |
| 2013/0117282 A1* | 5/2013 | Mugali, Jr. | ......... | H04L 61/1511 707/748 |

(Continued)

Primary Examiner — Taghi T Arani
Assistant Examiner — Lin Chang
(74) Attorney, Agent, or Firm — Morgan, Lewis & Bockius LLP

(57) ABSTRACT

A method evaluates whether a web domain is malicious. The method forms a feature vector, including data from web crawling. The features may include: whether the domain is cached from web crawling; the number of unique publicly accessible URIs hosted on the domain; the number of backlinks referencing the domain; the number of unique domain names in referring backlinks; the number of unique IP addresses in the referring backlinks; the number of unique IP address groups in the referring backlinks; and the proportion of hyperlinks to the domain from popular websites. For multiple classifiers, the method computes a probability that the domain is malicious. Each classifier is a decision tree constructed according to a subset of features and a subset of sample feature vectors. The method combines the individual probabilities to form an overall probability and returns the computed overall probability to the client.

20 Claims, 9 Drawing Sheets

(56) References Cited

U.S. PATENT DOCUMENTS

| | | | | |
|---|---|---|---|---|
| 2013/0282691 A1* | 10/2013 | Stouffer | ................ | G06F 16/958 |
| | | | | 707/710 |
| 2014/0372873 A1* | 12/2014 | Leung | ................... | G06F 16/958 |
| | | | | 715/243 |
| 2015/0310098 A1* | 10/2015 | Chudnovskiy | ........ | G06F 21/577 |
| | | | | 726/25 |
| 2016/0103861 A1* | 4/2016 | Jacob | .................... | G06F 16/958 |
| | | | | 707/711 |
| 2017/0346853 A1* | 11/2017 | Wyatt | ................... | G06F 21/577 |

* cited by examiner

Table of Sample Data 500

| Domain | Identifier | Feature 1: Domain present in data cache from previous web crawling? | Feature 2: # of uniquely publicly accessible URLs found to be hosted | Feature 2.1: Feature 2 in ranges | Feature 3: # of backlinks (in ranges) | Feature 4: # of Unique IP Addresses (in ranges) | Feature 5: Registration email | Feature 6 | Feature Z | Malicious or Benign |
|---|---|---|---|---|---|---|---|---|---|---|
| 1 | http://mynet.comp | N | | | | | | | | |
| 2 | 192.136.416.2 | N | | | | | | | | |
| 3 | https://startup.orb | Y | 6 | Low | High | Small | abc@xyz.comp | ... | ... | B |
| 4 | forums.public.comp | Y | 10 | Medium | High | Large | asd@123.network | ... | ... | B |
| 5 | 265.234.136.1 | Y | 31 | High | Low | Large | goodguy@email.orb | ... | ... | B |
| 6 | www.food.urban | Y | 45 | High | High | Large | smith@email.com | ... | ... | B |
| 7 | fake.network | Y | 13 | Medium | Low | Small | good@food.urban | ... | ... | B |
| 8 | juniper.stuff.mom | Y | 4 | Low | Low | Small | queries@food.urban | ... | ... | M |
| 9 | ftp://freebie.mmm | Y | 17 | Medium | Low | Small | xyz@entity.network | ... | ... | B |
| 10 | www.whitehouse.gov | Y | 32 | High | High | Large | catchme@space.buzz | ... | ... | M |
| | ... | | | | | | jones@tech.comp | | | B |
| | | | | | | | admin@nsf.gov | | | |

Figure 5

PREDICTIVE MODELING OF DOMAIN NAMES USING WEB-LINKING CHARACTERISTICS

RELATED APPLICATIONS

This application claims the benefit of U.S. Provisional Application No. 62/505,805, entitled "Predictive Modeling of Domain Names Using Web-Linking Characteristics," filed May 12, 2017, which is incorporated by reference herein in its entirety.

TECHNICAL FIELD

This application relates to methods, systems, and devices for scoring web domains as benign or malicious.

BACKGROUND

The Internet has become an important part of daily life. Every day, millions of users use the Internet to access social media and other web pages of interest. Users log on to their online banking accounts and perform transactions using the Internet. Users of the Internet can encounter many threats. For example, hackers can create malicious websites that appear to be real bank websites and trick account holders into giving away their login credentials. The hackers then use the login credentials to access the bank accounts and steal financial assets. Alternatively, malicious software (malware) can exploit security loopholes in users' computers, causing viruses to be downloaded and installed without any action on the part of the users. Sneaky malware can also disguise itself as a legitimate software download and cause network gateways of organizations to be compromised when the software is downloaded and/or executed. Accordingly, the threats encountered by the use of the Internet can lead to potential loss of personal information and financial assets, for both individuals and organizations.

Because of the increasing number of new and unknown web pages, some of which are potentially malicious, there is a need for methods, devices, and systems to accurately classify unknown websites and web domains for improved cybersecurity.

SUMMARY

A Uniform Resource Identifier (URI) is a compact sequence of characters that identifies an abstract or physical resource on a computer network. A URL is a type of URI used to reference a location on the world wide web. A domain name is an organization's unique descriptor listed within a URL. For example, in http://anomali.com, "anomali.com" is the domain name. A subdomain is a subordinate namespace associated with the domain name, such as online.anomali.com. An IP address is an identifier consisting of a sequence of decimal or hexadecimal numbers separated by periods or semicolons using the Internet Protocol to communicate over a network. An "indicator" is a forensic artifact involving a computing resource, such as a domain name, an IP address, or a URL. An "Indicator of Compromise" is an indicator associated with a computer security intrusion.

Today, many enterprises log user traffic transiting the organization's computer network perimeter and individuals' computer activity. This information, (comprised of indicators and their context) is collected and manually reviewed for suspicious or malicious behavior.

An Indicator of Compromise (IOC) is an indicator associated with a computer security event, such as an intrusion. Indicators of Compromise are identifiers of unusual activity that indicate a potential or in-progress attack that could lead to a data breach. In some implementations, IOCs include: a file name, the behavior observed while malware is actively running on an infected system, virus signatures, IP addresses, MD5 hashes of malware files, and URLs or domain names of botnet command and control servers.

After IOCs have been identified, they can be used in many intrusions for early detection of future attacks by using intrusion detection systems and endpoint protection software. Many enterprises prefer to automatically match previously known indicators of compromise to the large volume of this traffic. When network or endpoint activity involving an IOC is identified inside an organization, the appropriate security measures are taken to improve the security of the enterprise.

Having trusted information (sources) is at least as important as collecting the information. In some implementations, users are able to filter out unhelpful indicators coming into their organization by setting a threshold of the confidence values. Since millions of indicators are ingested every week, data quality is important. If users are dissatisfied with the data quality and/or unable to reduce data to a level that their organization can triage, their cybersecurity posture will be significantly and adversely affected.

In some implementations, the matching IOCs comes from a variety of sources with varying quality levels. Consequently, users need to effectively filter this stream of matching indicators. Organizations that under-filter are inundated with excessive actionable issues that they are not appropriately staffed to address and accordingly malicious traffic may be ignored. This under-filtering is known as a false positive or type I error. Conversely, if an organization over-filters, potentially malicious traffic may also be ignored. This over-filtering is known as a false negative or type II error.

Therefore, when a list or stream of matching identifiers is procured and/or created, a filtering mechanism is needed to more effectively filter out benign indicators and to identify and classify malicious indicators. In some implementations, the filtering mechanism uses a list or stream of matching rules that comprises domain names.

Disclosed techniques in this application effectively classify unknown domains automatically and without user intervention.

In some implementations, a method classifies web domains. The method is performed at a computer system having one or more processors and memory. The memory stores one or more programs configured for execution by the one or more processors. The method receives, from a client, a request to evaluate whether a web domain is malicious. The request includes an identifier of the web domain. The method forms a feature vector $v=[v_1, v_2, \ldots, v_n]$ whose components include a plurality of features. At least some of the features are based on web crawling data, which is stored in a data cache. In some instances, one of the features is the status of whether the domain is present in the data cache. In some instances, one of the features is the number of unique publicly accessible URIs that were found to be hosted on the domain in the previous web crawling. In some instances, one of the features is the number of backlinks referencing the domain. In some instances, one of the features is the number of unique domain names in referring backlinks. In some instances, one of the features is the number of unique IP addresses in the referring backlinks. In some instances, one of the features is the number of unique IP address groups in the referring backlinks. In some instances, one of the features is the relative proportion of hyperlinks to the domain from popular websites. The method typically uses a plurality of classifiers (e.g., 100 or 200 classifiers) to estimate whether a web domain is malicious. Each of the classifiers computes a respective probability that the web domain is malicious. Each classifier is a respective predictive model designed to minimize the expected error according to a respective distinct subset of the plurality of features and according to a respective distinct subset of predetermined sample feature vectors corresponding to web domains known to be benign or known to be malicious. In some implementations, the predictive model is a decision tree algorithm. In other cases, the predictive model is a support vector machine or a neural network. The method computes an overall probability that the web domain is malicious using a weighted sum of the computed probabilities (in some implementations, all of the weights are equal). The method then returns the overall probability to the client.

In some implementations, a computing system has one or more processors and memory. The memory is coupled to the one or more processors. The memory stores one or more programs configured to be executed by the one or more processors. The one or more programs include instructions for performing any of the methods described herein.

In some implementations, a non-transitory computer-readable storage medium stores one or more programs configured for execution by one or more processors of a computing system. The one or more programs include instructions for performing any of the method described herein.

Implementations can use a variety of data feeds, which are typically saved in a central data store. Data feeds may be pushed into the data store from external sources, or internally pulled from external data sources. In some implementations, before a domain is completely inserted, a confidence score is computed. A separate engine for scoring confidence is used to calculate a confidence score associated with each domain. In some implementations, when a user searches for a particular domain through a visual interface, the data store is searched and displays the relevant domains with the associated confidence.

Some predictive models use empirically measured data or initial suppositions to assign labels of maliciousness to web domains. Optimal weights for values from registration data and sandboxing data are allocated based on known malicious and benign domains. The weights may be tuned and further optimized as subsequent labeled data is obtained.

Thus, methods, devices, storage media, and computing systems are provided for classifying domains, thereby increasing the effectiveness of identifying malicious domains. Such methods may complement or replace conventional methods for domain classification.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 5 is a table of sample domains and their features, in accordance with some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, devices, components, and networks have not been described in detail so as not to unnecessarily obscure aspects of the implementations.

Figure 1:
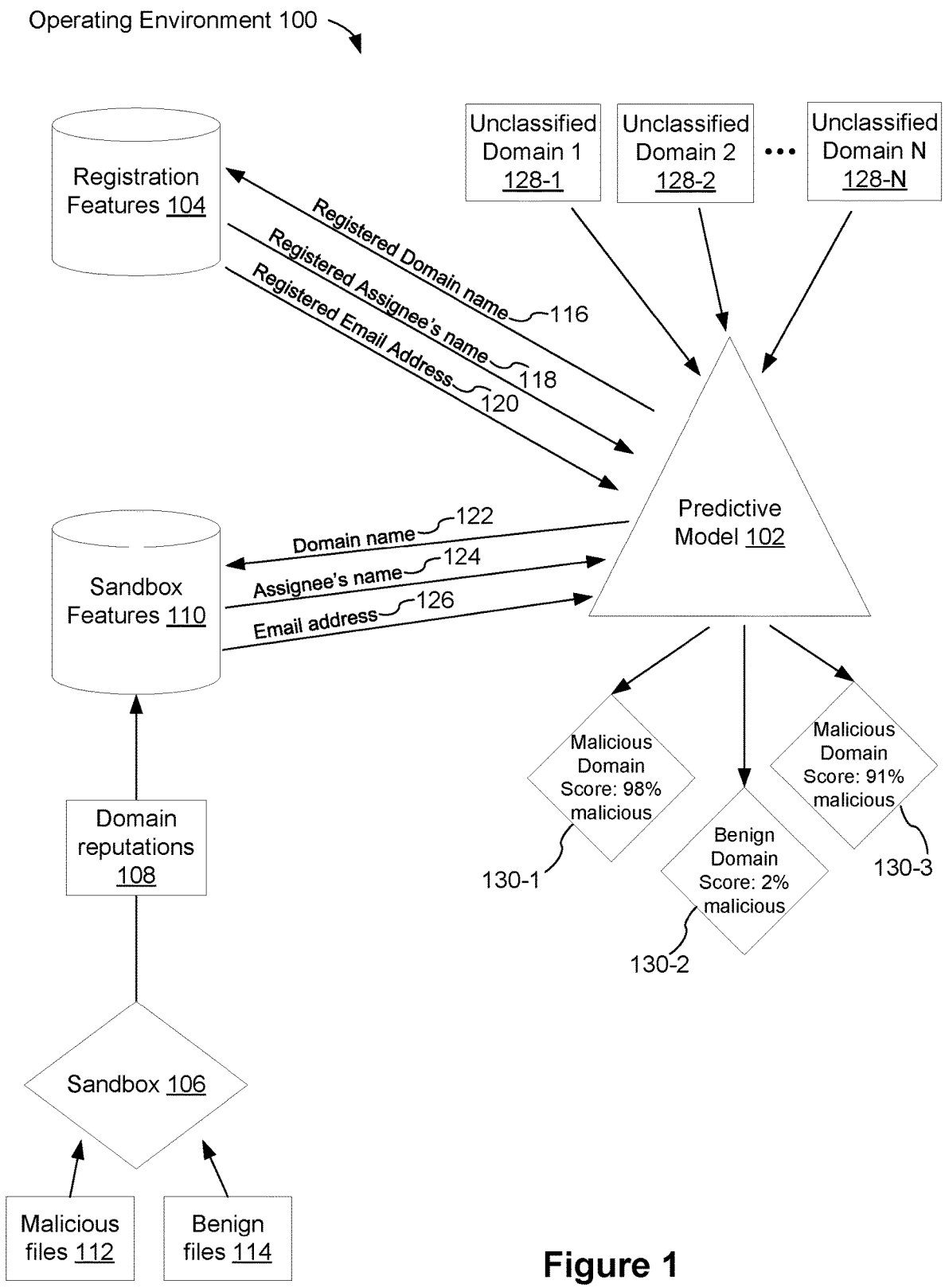
FIG. 1 illustrates an operating environment to classify domains, in accordance with some implementations.

FIG. 1 illustrates an operating environment 100 to classify domains, in accordance with some implementations.

The operating environment 100 includes a predictive model 102, which leverages information about domain indicators from a variety of data sources. The data sources include domain registration data in a registration features database 104, and sandbox data that is obtained from the execution of known malicious software and known benign software using a sandbox 106.

The registration features database 104 contains information associated with domain name registration. Registration establishes which name servers are associated with a domain name. The primary domain is the highest-level domain name that a registrant can register, and usually consists of the two rightmost tokens in the domain (e.g., anomali.com). In some instances (e.g., in non-US domain names such as anomali.co.uk) the primary domain consists of the three rightmost tokens. Typically, the registrant registers the primary domain name with a registrar. The registrant is the owner of the domain name, and the registrar is the organization responsible for hosting the name server record that points to the primary domain's servers. A registrar is usually in charge of a single top-level domain (TLD), which is the rightmost token in a domain name (e.g., .com, .org, .edu, .uk), although in some instances, the registrar delegates that authority to smaller registrars.

In some implementations, information associated with a domain registration record includes: the domain name, IP address(es), URL(s), TLD(s), data about the registrant (e.g., name, email address, mailing address, city of residence, and country of residence), the registrar, date of expiration, date of the latest update, and other information associated with the record.

Each item of domain registration information is sometimes referred to as a "feature" or an "attribute." For example, each of "registrant name," "Creation Date," "Registrar," and "registrant email address" is a feature or an attribute of the domain. The domain registration features can indicate whether certain entities have a higher tendency of registering domains associated with malicious sites, as well as whether a site is newly registered and has yet to establish its credibility. Thus, each domain registration feature provides an indication about the maliciousness of the domain.

In some implementations, the registration features database 104 is a database that is locally managed by the operating environment 100. For example, data is delivered to and stored in the registration features database 104 by means of a subscription service. In some implementations, the registration features database 104 is maintained by a third-party provider (e.g., a WHOIS database) and is accessed in real-time by the predictive model 102 through a query/response protocol.

The predictive model 102 is constructed using information stored in the registration features database 104 (e.g., a registered domain name 116, a registered assignee's name 118, and a registered email address 120). In some implementations, the predictive model 102 is constructed using information for all of the registered domains in the registration features database 104. In some implementations, the predictive model 102 is constructed using a subset of the registered domains in the registration features database 104.

Domains appearing on a whitelist are "benign" and domains appearing on a blacklist are "malicious." The registration features database 104 does not include a classification (e.g., benign or malicious). The domains and the predictive model 102 use empirically measured data, data from investigations, or initial suppositions to assign a classification to each domain.

In some implementations, the predictive model 102 assigns, for each feature of each domain in the domain registration database 104, a probability of maliciousness $P_i$ (i.e., a feature of a domain that is more likely to be malicious is assigned a higher probability). In some implementations, a feature is assigned an initial probability using an initial criterion, and the predictive model 102 may subsequently modify or optimize the initial probability assignment as it receives subsequent data from the registrations features database 104. For example, the predictive model 102 initially assigns the same probability value $P_1$ to email addresses badguy@badguyemail.com and goodguy@goodguyemail.com that are registered to two different domains. The predictive model 102 subsequently identifies that the email address badguy@badguyemail.com is used to register known malicious domains abadguy.com, iamthebadguy.net, and evilperson.biz, whereas the email address goodguy@goodguyemail.com is not associated with malicious activity. Using this subsequent information, the predictive model 102 increases the probability of maliciousness for email address badguy@badguyemail.com to $P_2$, where $P_2 > P_1$. This can also be applied to other features, such as backlink count. The model may learn that <5 backlinks increases the probability of maliciousness and >=5 backlinks decreases the probability of maliciousness. For weblink data, determining appropriate thresholds can be valuable for determining whether a domain is benign or malicious.

In some implementations, the predictive model 102 stores, in one or more databases 324, information about domains, features, classifications, weights, and/or probabilities.

In some implementations, the predictive model 102 is constructed using data from a sandbox 106. The sandbox 106 operates in its own protected environment, which is isolated from the operating environment 100. In some implementations, the sandbox 106 receives (e.g., from trusted third-party organizations, anti-virus software companies, and/or individuals) software that is known to be benign and software that is known to be malicious (e.g., malicious files 112 and benign files 114). The sandbox 106 executes the malicious files 112 and the benign files 114 and then monitors the network connectivity. In some implementations, the results of this monitoring environment produce measurements for each domain name or URL that the malicious files 112 and the benign files 114 attempt to contact. These measurements may identify how many different software artifacts anti-virus software identified as malicious compared to those it identified as benign for every indicator.

In some implementations, in accordance with the execution of software that is known to be malicious or benign, the sandbox 106 identifies domain names or URLs associated with the malicious files 112, identifies domain names or URLs associated with the benign files 114, and assigns respective domain reputations 108 to the domain names or URLs. For example, domains or URLs that the malicious files 112 attempt to contact are classified as having a "bad" or "malicious" reputation whereas domains or URLs that the benign files 114 attempt to contact are classified as having a "good" or "benign" reputation. The domain names, registration information, and associated reputations 108 are stored in a sandbox features database 110.

In some implementations, the execution of the software leads to an identification of characteristics (or features) that can be associated with domains having malicious or benign reputations, which are also stored in the sandbox features database 110.

The predictive model 102 is constructed using the sandbox data, including a domain name 122, an assignee's name 124, and an email address 126 for each domain with a "malicious" or "benign" reputation. In some implementations, the predictive model 102 uses all of the data in the sandbox features database 110 for construction. In some implementations, the predictive model 102 uses a subset of the data in the sandbox features database 110 for construction.

In some implementations, the predictive model 102 assigns a weight to each sandbox or domain registration feature. In some implementations, a feature that is determined to be more important is given a higher weight assignment. In some implementations, the predictive model 102 initially assigns weights to each feature using an initial criterion and further tunes and optimizes the weights as it receives subsequent data from the sandbox features database 110 and/or the registration features database 104.

In some implementations, after constructing the predictive model 102, the predictive model 102 receives a request to evaluate the maliciousness of an unclassified domain 128 (e.g., a domain 128-1, 128-2, or 128-N). The predictive model 102 extracts domain registration information (e.g., a domain name, an assignee's name, and an email address) associated with the unclassified domain 128 and identifies any sandbox features 110 related to the unclassified domain 128. The predictive model then uses all of these features to estimate a probability that the unknown domain 128 is malicious. As shown in FIG. 1, the first domain 130-1 has a computed maliciousness probability of 98% and the third domain 130-3 has a probability of 91%. On the other hand, the second domain 130-2 has a low probability of being malicious. Of course, even 2% could be considered high depending on risk tolerance. For example, in a corporation with thousands of employees, allowing the employees to access websites with a 2% chance of being malicious would likely lead to accessing too many malicious websites.

In some implementations, an unclassified domain is labeled as malicious or benign in accordance with the predetermined threshold overall probability or confidence score. For example, an implementation can set its threshold at 40%. In this case, domains with a computed overall probability equal to or exceeding 40% are classified as malicious whereas domains with a computed overall probability less than 40% are classified as benign.

In some implementations, the predictive model 102 uses empirically measured data or initial suppositions to assign weights to the features and probabilities to the feature data. Consequently, the overall probability or confidence score of the domains of known classification, as well as the outputs 130 of the domains of unknown classification, are probabilistic. Thus, the quality of the domain classification and scores of maliciousness in the outputs 130 are based largely on how well the data used for prediction correctly models the malicious or benign nature of all input domains. Accordingly, if the data can effectively describe the maliciousness of the domain, then the error rates will be low.

Figure 2:
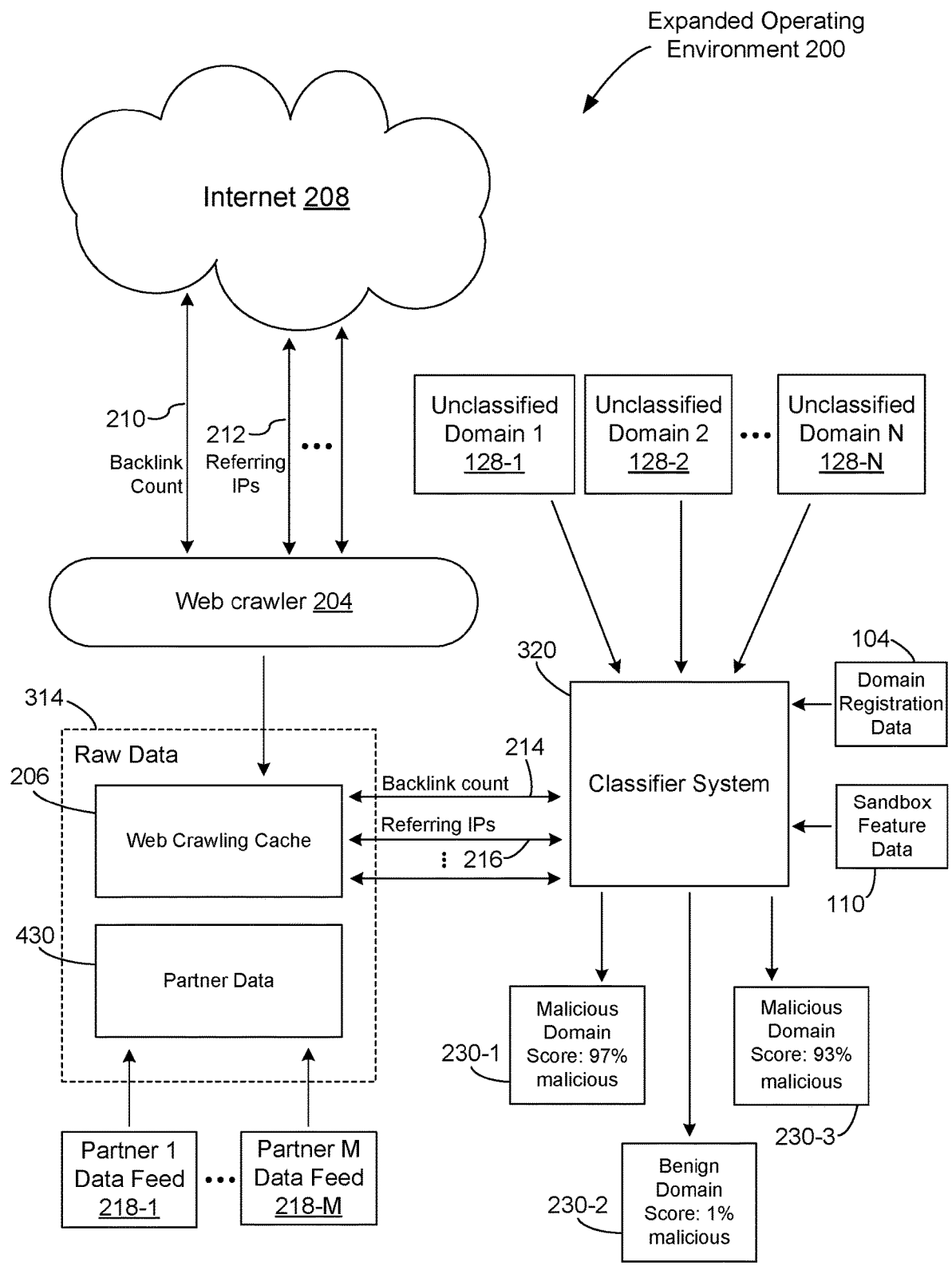
FIG. 2 illustrates another operating environment to classify domains, in accordance with some implementations.

FIG. 2 illustrates an expanded operating environment 200 to classify domains, in accordance with some implementations. In some implementations, the expanded environment 200 uses web crawling data in addition to domain registration data 104 and sandbox feature data 110. At the heart is the classifier system 320, which leverages information about domains, including web-linking information that is obtained from web-crawling the domains.

The expanded environment 200 includes a web crawler 204, which browses web pages on the Internet 208 in an automated manner. The web crawler 204 downloads web pages, extracts information from the web pages, parses the information, and indexes the information. In some implementations, the web crawler 204 asynchronously populates information about the domain names by recursively querying hyperlinks and their destinations. In some implementations, each web page is associated with its URL, and includes content, images, and links (e.g. tracking links, non-tracking links, and links to other websites). In some implementations, the web crawler 204 writes data to a web crawling cache 206, which is part of the stored raw data 314. The cache 206 stores downloaded, extracted, and compressed information. In some implementations, the web crawler 204 decompresses the information from the storage repository before indexing.

In some implementations, the web crawler 204 clusters the web pages crawled according to domains (or domain names). The web crawler 204 analyzes crawled data and generates analytics for web-linking characteristics of domains that are obtained from the web crawling. The web-linking characteristics for each domain includes: (i) the number of unique publicly accessible URIs that were found to be hosted on the domain; (ii) the count of backlinks 210 referencing the domain (a backlink occurs when an originating website hyperlinks to a destination website, in which case the destination website has one backlink from the originator); (iii) the count of unique domain names in referring backlinks (such domains are referred to as linking root domains); (iv) the count of unique IP addresses in the domain names of the referring backlinks 212; (v) the count of the unique IP address groups in the domain names of the referring backlinks (e.g., subnetworks or subnets); and (vi) the relative proportion of hyperlinks to the domain from popular websites. In some implementations, each of the web-linking characteristics is known as a "feature" or an "attribute."

In some implementations, data crawled by the web crawler 204 and analytics data generated by the web crawler 204 (e.g., web-linking information of domains) are stored in the web crawling cache 206.

In some implementations, web crawling is performed by several distributed web crawlers 204 operating concurrently. In some implementations, the web crawler 204 includes crawlers, indexers, and sorters, each performing a respective role of: crawling and extracting; parsing and indexing; and analysis of parsed information.

In some implementations, the expanded environment 200 includes operating partners that provide partner data feeds 218 (e.g., partner feeds 218-1 to 218-M). The received feeds are stored as partner data 430 in the raw data 314. The partners include trusted individuals and third-party organizations such as anti-virus software providers and anti-malware providers, and/or organizations that maintain lists of benign and malicious domains. In some implementations, the web crawler 204 utilizes the partner data 430 to identify lists of target URLs, domains, and/or IP addresses of known classifications (i.e., benign or malicious). The web crawler 204 crawls the Internet 208 in search of the target web pages and performs analytics on the web crawling data associated with the target URLs, domains, and/or IP addresses.

In some implementations, information about a domain, its classification, and its web-linking characteristics (e.g. a count of backlinks 214 referencing the domain and a count of unique IP addresses in the domain names of the referring backlinks 216) is used to construct the classifiers 326 in the classifier system 320.

Web-linking characteristics provide information about the maliciousness of domains. For example, a domain name with many subordinate URLs requires more effort to build and thus has a higher chance of being benign, whereas malicious domains tend to be hastily created and short-lived. Thus, the inclusion of web-linking information, such as the number of backlinks 214 and the number of referring IPs 216, is valuable for constructing domain classifiers.

The classifier system 320 is used to evaluate unclassified domains 128 (e.g., the domains 128-1, 128-2, . . . 128-N). For a new domain 128, new features associated with the unclassified domain 128 are obtained. When a new domain name arrives 128 in the input stream, the web-linking information is retrieved from the cache 206. Additional features may be retrieved from the domain registration data 104 and/or the sandbox feature data 110.

Based on the features for the new domain 128, each of the classifiers 326 computes a probability that the new domain 128 is malicious. The individual probabilities are then combined to form an overall probability, which is the estimate provided by the classifier system 320. For example, FIG. 2 illustrates a first domain 222 having a score of 97% (malicious), a second domain 224 having a score of 1% (benign), and a third domain 226 having a score of 93% (malicious).

Figure 3A:
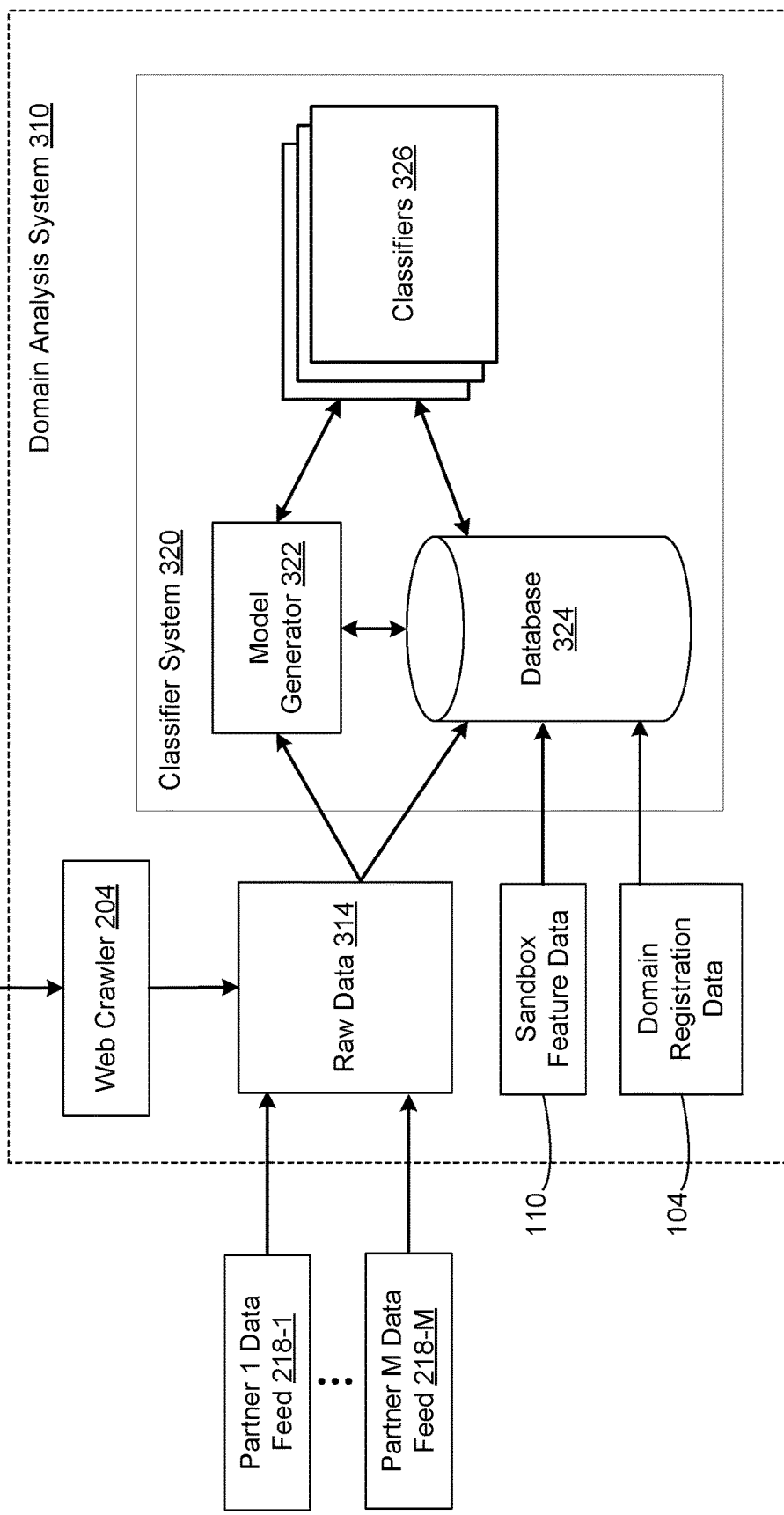
FIG. 3A illustrates a domain analysis system, in accordance with some implementations.

FIG. 3A illustrates the components of a domain analysis system 310, in accordance with some implementations. The domain analysis system 310 includes the web crawler 204, the raw data store 314, the sandbox feature data 110, and the domain registration data 104. The classifier system 320 is also part of the domain analysis system. The classifier system 320 performs two primary functions. First, the classifier system 320 uses the data it has regarding known benign and malicious domains to build a set of classifiers 326 (e.g., a hundred or more classifiers). Then, the classifiers 326 are applied to unclassified domains to estimate whether they are malicious. The model generator 322 in the classifier system 320 builds the classifiers 326 using data in the database 324 or in the raw data storage 314.

The web crawler 204 crawls the Internet 208 for information. In some implementations, the web crawler 204 downloads web pages, extracts information from the web pages, parses the information, and indexes the information. This is described in FIG. 2. Data obtained by the web crawler 204 (i.e., both web-crawling data and analytics data generated by the web crawler 204) is stored in the raw data store 314 and/or the database 324.

Sandbox data 110 is provided by the sandbox environment 106, described in FIG. 1. This is a controlled, protected environment, which is isolated from the domain analysis system 310. The sandbox environment 106 is a protected environment that closely resembles a normal operating environment, which is able to identify benign and malicious software without risking a true operating environment.

In some implementations, the domain analysis system 310 partners with trusted third-party organizations, cyber-security companies, certified hackers, anti-virus software companies, and/or individuals, and receives software of known classification (i.e., software that is known to be benign or malicious). In some implementations, the software is placed in the sandbox 106. The sandbox 106 executes the software of known classification and then monitors the network activity. In some implementations, monitoring this environment identifies domain names or URLs that the software of known classification attempts to contact. Thus, the sandbox 106 identifies domain names or URLs associated with the known malicious software and/or known benign software, and assigns a respective classification to each of the identified domains or URLs. The identified domain names (or URLs) and their classifications are stored in the raw data store 314.

In some implementations, after identifying the domains and their classifications from the software execution, the sandbox 106 sends information about the identified domains to the web crawler 204. The web crawler 204 crawls the Internet 208 to obtain web-linking data on the domains that have been identified by the sandbox 106. In some implementations, the web crawler analyzes the data from web crawling and generates web-linking features associated with the domains. The web-crawling data, including web-linking data, are stored in the raw data store 314.

In some implementations, after identifying domains and their classifications, the sandbox 106 provides feedback to the respective partners that provided the software. In some implementations, the sandbox 106 sends information about the identified domains and their classifications to the respective partners, which in turn blacklists the domains that have been identified as malicious and whitelists the domains that have been identified as benign.

In some implementations, the sandbox 106 further operates as a controlled, standalone "bait" to attract suspects wanting to infect. (This is sometimes referred to as a honeypot.) The sandbox 106 receives "suspicious" data from potentially malicious sources and analyzes the data to identify features pertaining to the potentially malicious sources. The identifiers of the data sources (e.g., URLs, domains, and IP addresses) and their features are stored in the database 324. The "suspicious" data is either stored in a quarantine module, in the sandbox 106, or discarded.

In some implementations, the partner data feeds 218 include names of domains and their classifications (i.e., benign or malicious) and registration features. In some implementations, in response to receiving the data for the domains, the web crawler 204 crawls the Internet 208 to locate (i.e., obtain and/or generate) web-crawling data for the domains.

In some implementations, the data stored in the raw data store 314 or the database 324 is organized in a table format, with domains as rows and features as columns, as illustrated in FIG. 5.

The classifier system 320 includes a model generator 322, a database 324, and the classifiers 326 created by the model generator 322. In some implementations, each classifier is a decision tree induction function that produces a decision tree. The model generator 322 generates decision trees using sample data from the database 324 and/or the raw data 314.

Each non-leaf node in a decision tree corresponds to a feature. When an unclassified domain is evaluated, the feature values for the domain determine the traversal through the decision tree. At some nodes, the decision is binary (e.g., the number of backlinks is either >5 or else ≤5). In this case, there are two branches in the tree. For other nodes, the decision is non-binary (e.g., the possible values for a feature are portioned into three or more ranges).

The classifiers 326 are developed and trained using training data from domains of known classification. Then, the features in each decision tree are selected for efficient execution and accuracy. The classifiers 326 are then used to classify domains of unknown classification. The classifiers 326 embody patterns or rules inferred from the training data.

The sample data includes a feature vector for each domain having known classification. The components of the feature vectors are features corresponding to the domain (e.g., web-linking features and domain registration features). The model generator 322 builds decision trees using subsets of the feature vector components and subsets of the sample domains. In some implementations, each decision tree is assigned a weight, which is used when combining the results of the classifiers. In other implementations the vote is averaged across the estimators or fed into an additional model generator as features (e.g., using stacked machine learning).

Figure 3B:
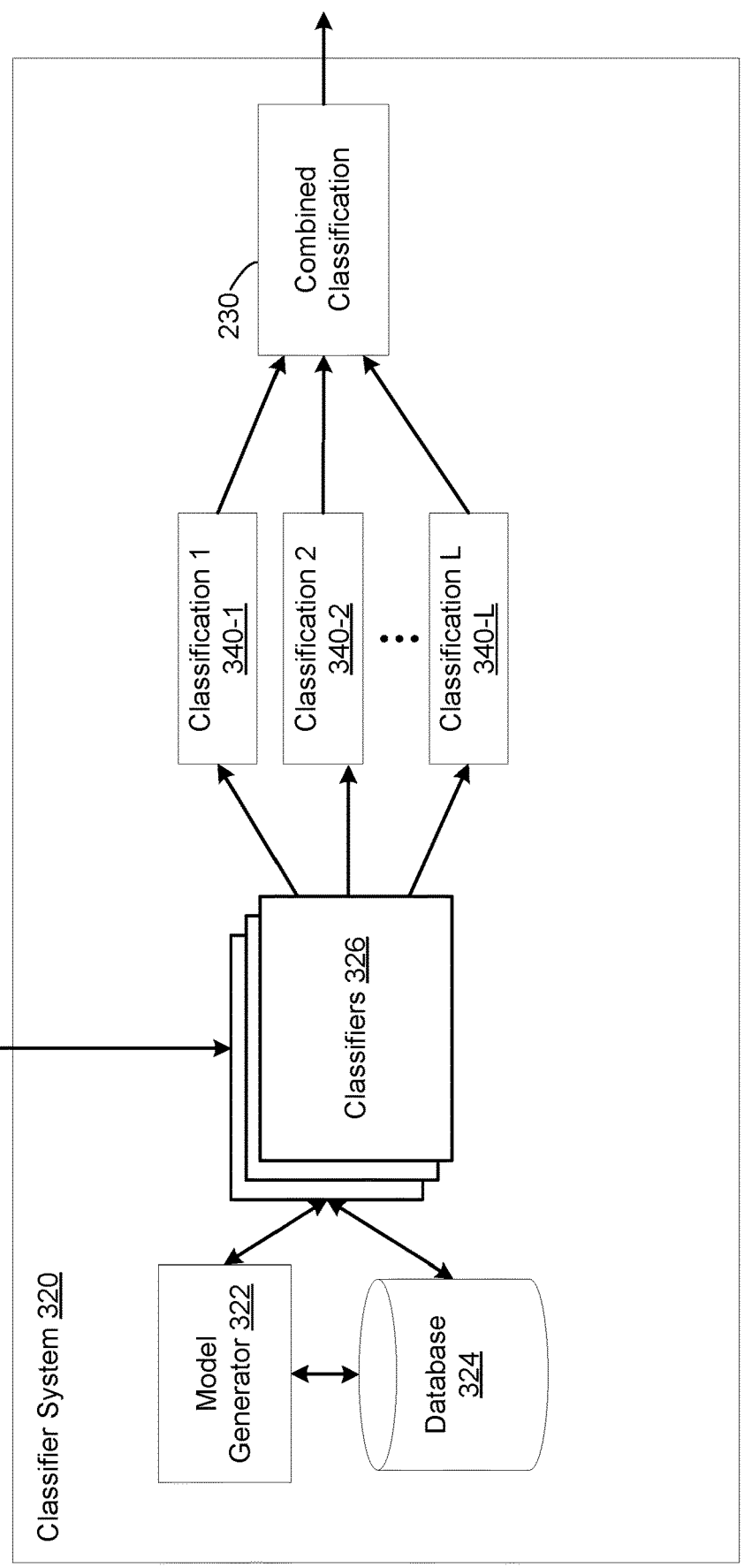
FIG. 3B illustrates the classification of unknown domains using a classifier system, in accordance with some implementations.

FIG. 3B illustrates the classification of unknown domains using the classifier system 320, in accordance with some implementations.

After the classifiers 326 have been developed and trained, the classifier system 320 receives a request to classify an unclassified domain 128. A feature vector for the unknown domain is created, which includes web-linking features and/or domain registration features 104 and/or sandbox features 110. In some implementations, each classifier is a decision tree, and each classifier computes a respective probability that the unclassified domain 128 is malicious by traversing the respective decision tree according to the relevant features in the feature vector. For example, a first classifier computes a first classification 340-1, which estimates the probability that the unknown domain 128 is malicious. A second classifier computes a second classification 340-2, which is independent of the first classification 340-1. With L distinct classifiers (e.g., L=200), the final classification 340-L is independent of all the other classifications 340-1, 340-2, . . . 340-(L−1).

An overall probability that the unclassified web domain 128 is malicious is computed by combining the individual calculations. In some implementations, the overall calculation uses a weighted sum of the computed probabilities. The overall probability 230 is returned to the client (or output on a display device 406).

In some implementations, the classifier system 320 includes a computational module 434, which executes each of the classifiers and combines the individual probabilities to form the overall combined classification 230. In some implementations, the classification system 320 includes a separate confidence scoring engine for calculating confidence scores associated with each overall classification.

In some implementations, in accordance with the determination of the overall probability of maliciousness, the classifier system 320 updates the status of the unclassified domain 128 from "unclassified" to "classified." In some implementations, the now-classified domain 128 is added to the training data and may be used for building new classifiers 326 or updating existing classifiers.

In some implementations, the domain analysis system 310 includes a visual interface that allows a user to search the database 324 for a particular indicator using the visual interface. In response to the search queries, the domain analysis system 310 queries the database 324 and displays the relevant indicators with the associated confidence.

In some implementations, the classifier system 320 notifies partners about the status updates.

In some implementations, after an unknown domain has been identified by the classifier system 320 as malicious, the classifier system 320 issues a notification to the user. In some implementations, the classifier system 320 notifies local on-premise equipment (e.g., firewalls, intrusion prevention system, endpoint protection systems) to prevent the user from accessing the website(s) of domains that have been identified as malicious.

In some implementations, including web-linking data features improves the confidence scoring of domain prediction. In some instances, using feature vectors with web-linking data features in addition to domain registration data features decreases false positive errors by 50%. In some instances, the addition of web-linking data features decreases false negative errors by 5-10%.

Figure 4:
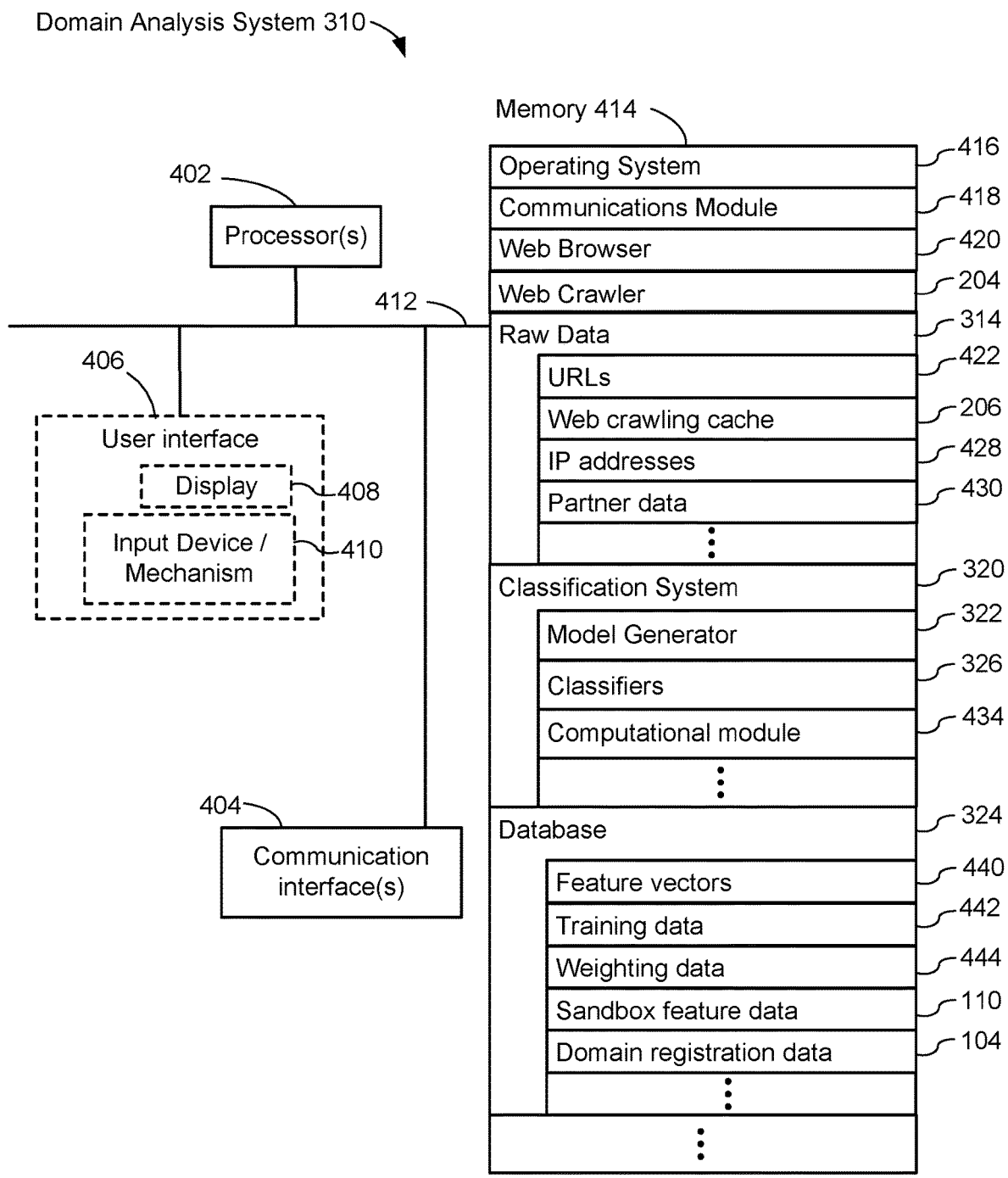
FIG. 4 is a block diagram of a domain analysis system, in accordance with some implementations.

FIG. 4 is a block diagram of the domain analysis system 310, in accordance with some implementations. The domain analysis system 310 includes one or more processors/CPUs 402, one or more communication interfaces 404, memory 414, and one or more communication buses 412 (sometimes called a chipset) for interconnecting these components, in accordance with some implementations.

The domain analysis system 310 optionally includes a user interface 406, a display 308, and one or more input device(s)/mechanism(s) 410 that facilitate user input, such as a keyboard, a mouse, a voice-command input unit or microphone, a touch screen display, a touch-sensitive input pad, a gesture capturing camera, or other input buttons or controls. In some implementations, the domain analysis system 310 uses a microphone and voice recognition or a camera and gesture recognition to supplement or replace the keyboard.

The memory 414 includes high-speed random-access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid-state storage devices. In some implementations, the memory 414 includes one or more storage devices remotely located from the one or more processors 402. The memory 414, or alternatively the non-volatile memory within the memory 414, is a non-transitory computer-readable storage medium. In some implementations, the memory 414, or the non-transitory computer-readable storage medium of the memory 414, stores the following programs, modules, and data structures, or a subset or superset thereof:

- an operating system 416, which includes procedures for handling various basic system services and for performing hardware dependent tasks;
- a communications module 418, which connects to and communicates with other network devices coupled to one or more communication networks via one or more communication interfaces (wired or wireless);
- a web browser 420, which enables a user to locate, access, and display web pages;
- a web crawler 204, which crawls web pages on the Internet 208, downloads the web pages, extracts information (e.g., hyperlinks) from the web pages, indexes the information, and analyzes the crawled information;
- a raw data store 314, which stores raw (e.g., unprocessed) information including:
    URLs 422;
    web crawling data 206, including hyperlinks;
    IP addresses 428; and
    partner data 430 from trusted third-party organizations, cyber-security companies, certified hackers, anti-virus companies, anti-malware companies, and/or trusted individuals;
- a classification system 320, as illustrated above in FIGS. 2, 3A, and 3B. The classification system 320 includes:
    a model generator 322, which builds the classifiers 326 (e.g., decision trees) using sample domains with known features and classifications. Each of the classifiers is constructed according to a respective subset of the features and a respective subset the sample domains. Because an individual model may be over-fitted to its specific data and features, many different classifiers are constructed. By combining many distinct classifiers that are trained on different domains and different features, the quality of the combined result is consistently better than a single classifier;
    a plurality of classifiers 326, each of which is constructed based on a distinct subset of the sample domains and a distinct subset of the features. Each classifier is essentially a function C whose input is a feature vector v. The classifier computes a value C(v), which is a probability that the domain corresponding to the feature vector is malicious. In some implementations, the lexical properties of the domain itself are a component of the feature vector. Because C(v) is a probability, the values are typically restricted to the range $0 \leq C(v) \leq 1$; and
    a computational module 434, which builds a feature vector 440 for a domain, executes each of the classifiers 326 to compute a corresponding classification value 340, and combines the individual classification values 340 to compute a combined classification 230. In some implementations, the combined classification is a weighted average of the individual classifications 340. In some implementations, all of the classifiers are equally weighted. In some implementations, the weights are initially all equal, and as the classifiers are used, the weights are adjusted according to the feedback;
- a database 324 for storing data, including:
    feature vectors 440, which are generated both for the sample domains (that are already classified) as well as domains that have not yet been classified. The feature vectors have a well-defined set of components, where each component is a specific piece of information related to the domain (e.g., the email address of the domain owner or the number of backlinks). Some implementations convert a raw data feature into a binary feature (e.g., is the email address of the domain owner in a list of specific email addresses). Some implementations create calculated features based on other features. More generally, if $v_1, v_2, \ldots, v_n$ are features that are already computed, some implementations define a new feature $f(v_1, v_2, \ldots, v_n)$, which is a function of the other features. The function $f$ can include both arithmetic and Boolean logic. In some instances, not all of the feature information is available for a domain, in which case the corresponding feature components are blank or NULL. For example, if a web domain was not included in the most recent web crawl, there may be no information about back links or any of the other web-linking features. In some implementations, the feature vectors are viewed as rows of data in a table, with each feature corresponding to a defined column. This is illustrated in FIG. 5;

training data 442, including data for domains that are already classified;

weighting data 444, including weight assignments for features within a single classifier and/or weights used to combine the results of multiple classifiers;

sandbox feature data 110, including data generated by the sandbox 106;

domain registration data 104, including data about registered domain owners retrieved from one or more domain registrars; and other features, such as geographical information about the IP address. This can include city, state, postal code, or country associated with the IP address or the domain name. The other features may also include autonomous system numbers (ASN) for uniquely identifying an administrative organization on the Internet.

In some implementations, the domain analysis system 310 includes a notification module, which generates alerts or notifications to clients and/or partners. For example, when a domain is classified, the domain analysis system 310 may generate notifications to alert the client and/or partners about the status of the domain, particularly when the domain is identified as malicious.

The domain analysis system in FIG. 4 may be implemented on one or more computing devices. The computing devices may include a desktop computer, a laptop computer, a tablet computer, a smartphone, a server computer, a server cluster, or other computing devices that have processors and memory. FIG. 4 is intended more as a functional description of the various features that may be present rather than as a structural schematic of the implementations described herein. In practice, and as recognized by those of ordinary skill in the art, items shown separately could be combined and some items could be separated.

FIG. 5 shows a table 500 of values for web domains and their features, in accordance with some implementations. Each of the rows of the table 500 represents a domain. Most of the columns specify features of the web domains.

In some implementations, the table 500 and at least some of its entries are generated by the classifier system 320 using data in the raw data store 314. In some implementations, the features include both web-linking features that are obtained by web crawling (e.g., Features 2, 3, and 4) and domain registration features that are obtained from domain registrars.

The first column 502 is a unique row number or index for the domains, and the second column 504 is a unique identifier for the domains. The unique identifier can be an IP address or a domain name. (Note that the entries in this example, other than www.whitehouse.gov, are intentionally invalid.)

In some implementations, the identifier of the web domain is an IP address. For example, the identifier of the second domain, as illustrated in row 524, consists of the IP address "192.136.416.2". Since hostnames represented as IP addresses do not convey information about the host (e.g., the organization it belongs to), URLs typically employ human-readable domain names instead in accordance to the Domain Name System.

In some implementations, the domains include different protocols (e.g., "https" in the third row 526, "http" in the first row 522, and "ftp" in the ninth row 538). The protocol portion of the URL indicates which network protocol should be used to fetch the network resource. In some implementations, the domains have different top-level domains (TLD) which is the rightmost token in a domain name (e.g., ".comp" in the first row 522, ".orb," in the third row 526, and ".gov" in the tenth row 540).

In the third row 526 of the table 500, the data entries are values corresponding to features of the third domain, including: (i) whether the domain present in the data cache from previous web crawling (Feature 1 column 506); (ii) the number of unique publicly accessible URIs found to be hosted (Feature 2 column 508); (iii) the number of backlinks (Feature 3 column 512); (iv) the number of unique IP addresses (Feature 4 column 514); (v) the registration email address (Feature 5 column, 516); and other features through Feature Z 518. The table 500 also includes a classification 520 of whether the domain is malicious or benign.

In some implementations, the table 500 includes computed or categorized values, such as Feature 2.1 column 510, which is computed from Feature 2 column 508. In some implementations, after obtaining values corresponding to a feature, the classifier system 320 assigns each value to a category (e.g., based on thresholds). For example, the entries in Feature 2 column 508 represent actual numbers of unique publicly URIs found to be hosted by each domain. In this example, the classifier system 320 defines the categories "low," "medium," and "high," and assigns values less than 10 to the "low" category, values between 10 (inclusive) and 20 to the "medium" category, and values greater than 20 (inclusive) to the "high" category. Thus, the entries in the Feature 2.1 column 510 are categories that represent ranges of values in the Feature 2 column 508.

In some implementations the table 500 contains hundreds, thousands, or millions of rows, each row representing a distinct domain having a known classification. In some implementations, the table 500 includes hundreds or thousands of columns, each column representing a distinct feature of the domains.

In some implementations, the table 500 includes one or more domains of known classification with a partial set of known features. For example, the first and second rows 522 and 524 correspond to domains that are not in the web crawling cache 206, so they have no data for the web linking features 508, 510, 512, or 514. In some implementations, features whose values are not known or yet to be determined are assigned a NULL or blank value. In some implementations, the table 500 is updated when new values of domains features are determined and/or existing values of domain features are updated.

Figure 6:
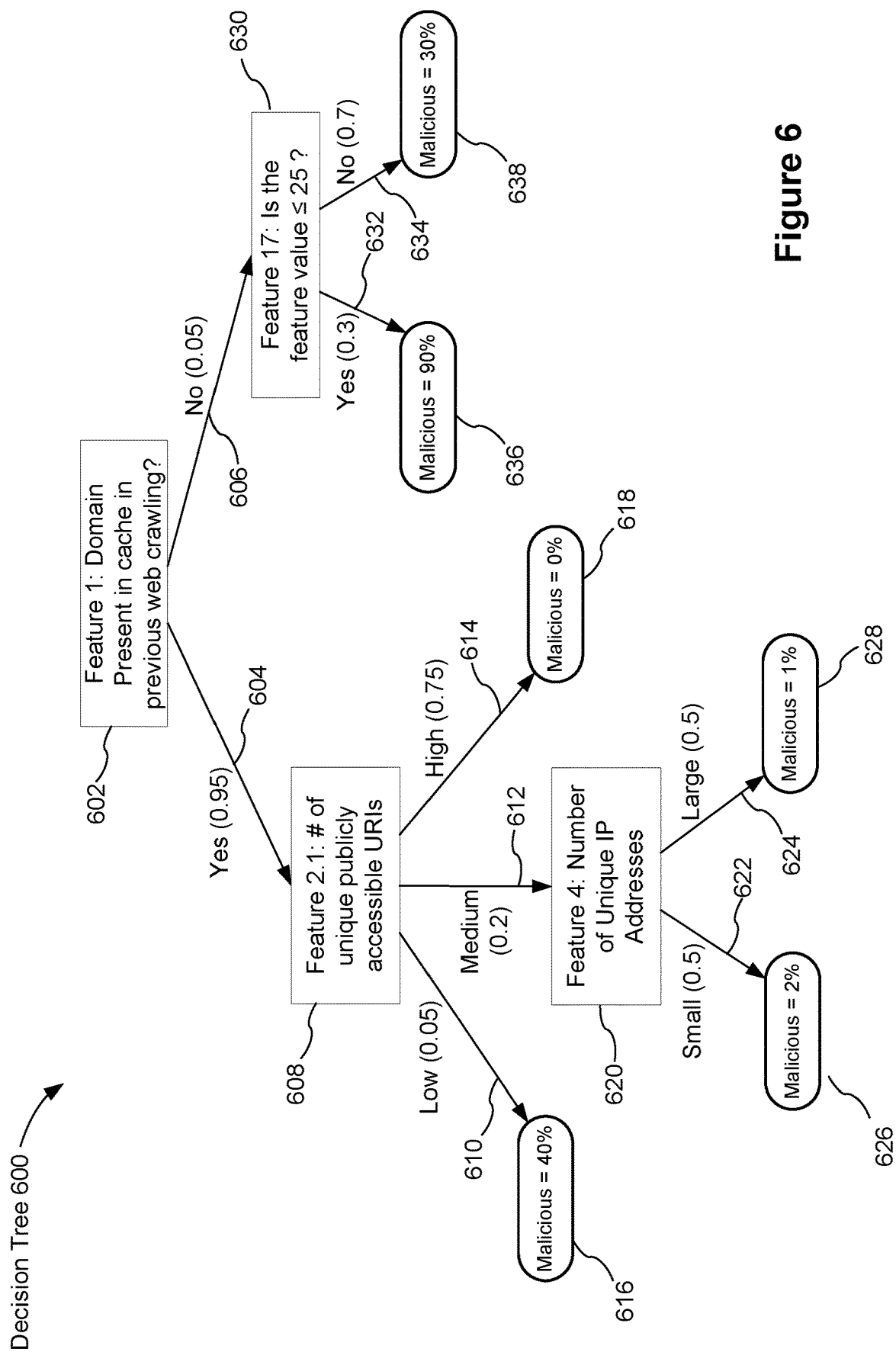
FIG. 6 is a decision tree for evaluating web domains, in accordance with some implementations.

FIG. 6 illustrates a simplistic decision tree 600 for a classifier 326, which has been constructed by the model generator 322 using the sample data in table 500.

The decision tree 600 has four decision nodes 602, 608, 620, and 630, nine branches 604, 606, 610, 612, 614, 622, 624, 632, and 634, and six leaf nodes 616, 618, 626, 628, 636, and 638.

Classification using a decision tree proceeds from top to bottom. The node 602 at the top of the decision tree 600 is sometimes called the root node.

The root node 602 corresponds to Feature 1 (column 506) in the table 500. The root node 602 has two branches 604 and 606 that correspond to the two possible values ("Yes" or "No") of Feature 1.

The branch 604 leads to the decision node 608, which uses Feature 2.1 (column 510) of the table 500. The node 608 splits into three branches 610, 612, and 614, each of the branches corresponding to a possible value ("low," "medium," or "high") of Feature 2.1. The decision node 630 uses Feature 17 in the table 500. The node 630 splits into two branches 632 and 634, depending on whether the feature value is greater or less than 25. Classification probabilities are specified by the leaf nodes 616, 618, 636, and 638 at the ends of the branches 610, 614, 632, and 634.

The decision tree 600 further splits on the decision node 620 at the end of the branch 612. The node 620 uses Feature 4 (column 514) of the table 500. The node 620 splits into two branches 622 and 624, each of the branches corresponding to the possible values ("small" or "large") of Feature 4. Classification probabilities are specified by the leaf nodes 626 and 628 at the ends of the branches 622 and 624.

As illustrated by the decision node 630, threshold values may be used to split feature values at a meaningful point. Selecting a single threshold converts a numeric range of values into a Boolean value that specifies where a feature value falls in relation to the threshold value. In some implementations, such threshold values are determined by the model generator 322 while building a decision tree, as discussed below.

The model generator 322 typically builds many independent classifiers 326, each comprising a decision tree. To build one of the decision trees, the generator 322 first selects a subset of the sample domains (e.g., rows from the table 500) and selects a subset of the features (e.g., columns from the table 500). For example, if the sample data has 50,000 rows and 50 features, some implementations select a subset of 1000 rows and 15 features. By selecting different subsets of domains and features, each of the classifiers is independent of the other classifiers. The combination of all the classifiers greatly reduces the bias of any individual classifier. (e.g., caused by over-fitting to specific data). Because there are far fewer malicious domains, the selection is typically performed in a way that guarantees the presence of some malicious domains in the sample selected for each of the classifiers.

In some implementations, the model generator 322 builds the decision trees using the ID3 algorithm or the C4.5 algorithm. Some implementations use the concept of entropy to build decision trees, selecting decision features that reduce entropy as much as possible at each decision node. A node is "pure" (0 entropy) when all of the sample domains at the node are benign or all of the sample domains at the node are malicious. If S is the original set of samples, B is the subset of the samples that are benign, and M is the subset of the samples that are malicious, then some implementations define the entropy as:

$$H(S) = -\left(\frac{|B|}{|S|}\log_2\frac{|B|}{|S|} + \frac{|M|}{|S|}\log_2\frac{|M|}{|S|}\right)$$

Note that this formula makes sense when $|B|=0$ or $|M|=0$ because $$\lim_{x \to 0^+} x \cdot \log(x) = 0.$$

That is, $H(S)=0$ when $|B|=0$ or $|M|=0$.

The goal is to put a decision at the node that reduces the entropy as much as possible. Consider first evaluating a feature $f$ with only two distinct values (e.g., true or false, such as the first feature 506 in the table 500). Label the two values as v and w. Suppose this feature is used to split the node into two branches. From the original set S, let $S_v$ be the subset of samples whose $f$ feature value is v, and let $S_w$ be the subset of samples whose $f$ feature value is w. Define $B_v$, $B_w$, $M_v$, and $M_w$ to be the subsets of B and M whose $f$ feature values are v and w, as indicated by the subscripts. In this case, the total entropy if we use the feature $f$ is:

$$H_f(S) = \frac{|S_v|}{|S|} \cdot H(S_v) + \frac{|S_w|}{|S|} \cdot H(S_w)$$

That is, the total entropy is the sum of the individual entropies, weighted according to the proportion of the samples that are in each branch. The individual entropies $H(S_v)$ and $H(S_w)$ are computed in the same way as $H(S)$ above, but based on the subsets. For example, $$H(S_v) = -\left(\frac{|B_v|}{|S_v|}\log_2\frac{|B_v|}{|S_v|} + \frac{|M_v|}{|S_v|}\log_2\frac{|M_v|}{|S_v|}\right)$$

The calculation for $H_f(S)$ when there are two feature values can be extended to the case where the feature $f$ has more than two distinct values. The total entropy is the sum of all of the individual entropies, weighted by the proportion of the samples having each of the feature values.

The same process can be extended to numeric features with ranges of values. A first way to utilize numeric features is to consider each feature $f$ as a parameterized set of features, where the parameter is a threshold value θ. For each value of θ, there is a Boolean feature $f_\theta$, which is true or false for a domain depending on whether the feature value is less than the threshold value. Some implementations extend this to using two or more threshold values, which subdivides the feature values into more ranges. Of course, the greater number of possible parameterized features, the greater the processing time that is needed to build the decision trees.

For each feature or parameterized feature (in the selected subset of features), the model generator 322 computes what the entropy would be at a node if the feature were used to divide the samples. If a given node has zero entropy or there is no feature that can reduce the entropy further, then the model generator designates the node as a leaf node. The probability estimate for the node is the proportion of the samples at the node that are malicious. For example, if 50 of the samples (e.g., out of an original 2000) follow the decision tree to a given node, and exactly one of the samples at the node is malicious, then probability for the node is 2%.

The model generator 322 starts at the root node with a specified set of samples and a specified set of features to work with. After finding a feature that reduces the entropy the most, the model generator recursively creates additional nodes and identifies features to use at the additional nodes in the same way. Consequently, the first decision will decrease the entropy (or increase information gain) the most of any decision in the tree. As noted above, a given node is designated as a leaf node when the node is pure or there is no feature that can reduce the entropy. In some implementations, the node becomes a decision node only when a feature can reduce the entropy by a minimum amount or percentage. For example, if the best possible feature for a node could only reduce the entropy by a trivial amount, the node may be designated as a leaf node. In some implementations a maximum threshold is set on the number of decisions or number of leaves that may be added to the decision tree causing a premature exit and yielding a smaller decision tree. In some implementations, portions of a decision tree are pruned after the decision tree is constructed.

In general, not all of the features are actually used in the decision tree. It is not necessarily known beforehand what features are relevant or the most relevant.

Figure 7:
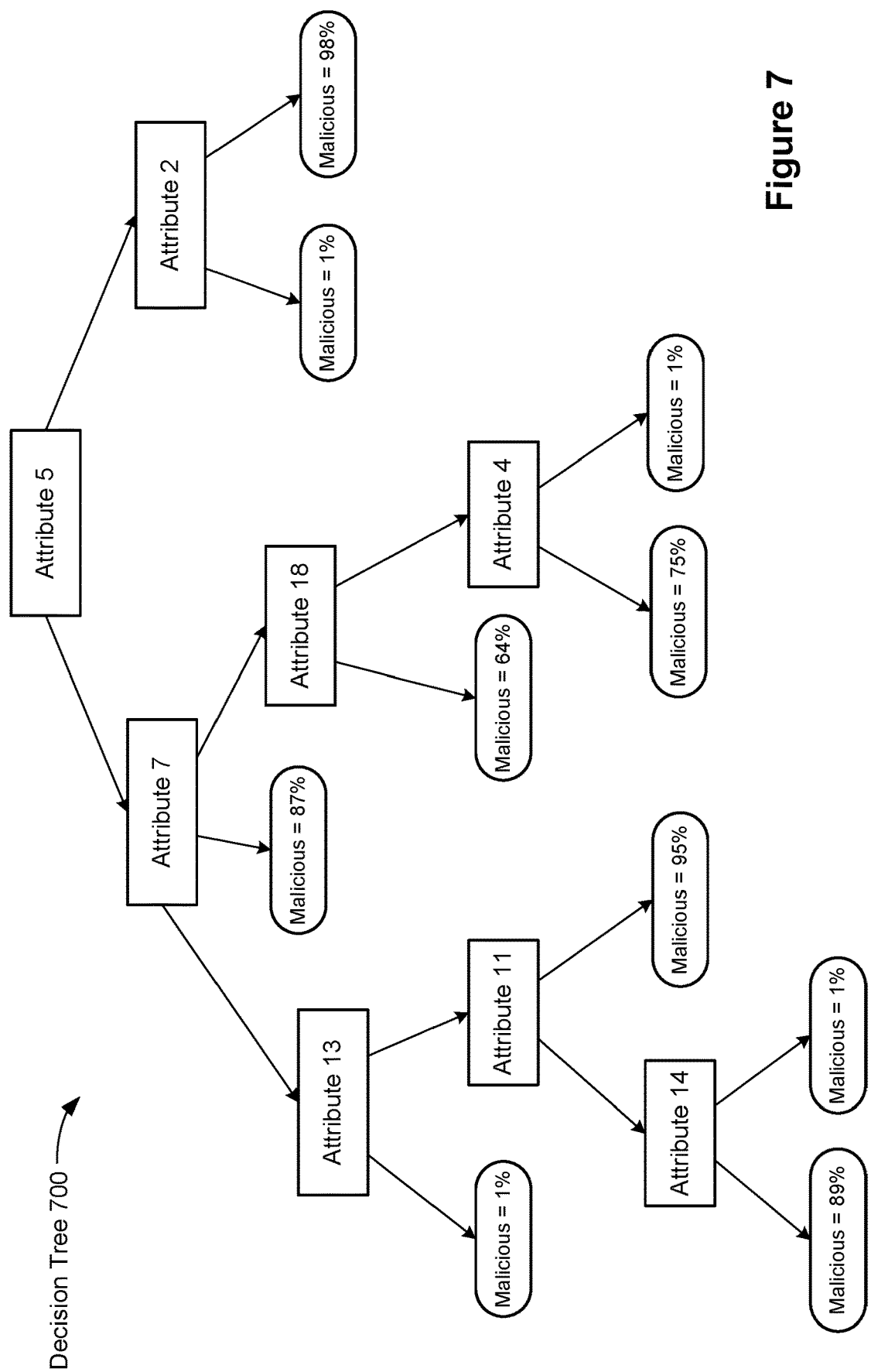
FIG. 7 provides a decision tree, in accordance with some implementations.

FIG. 7 provides a skeletal decision tree 700, which illustrates that decision trees are typically not balanced, and can use a variety of different attributes in different parts of the tree.

Figure 8:
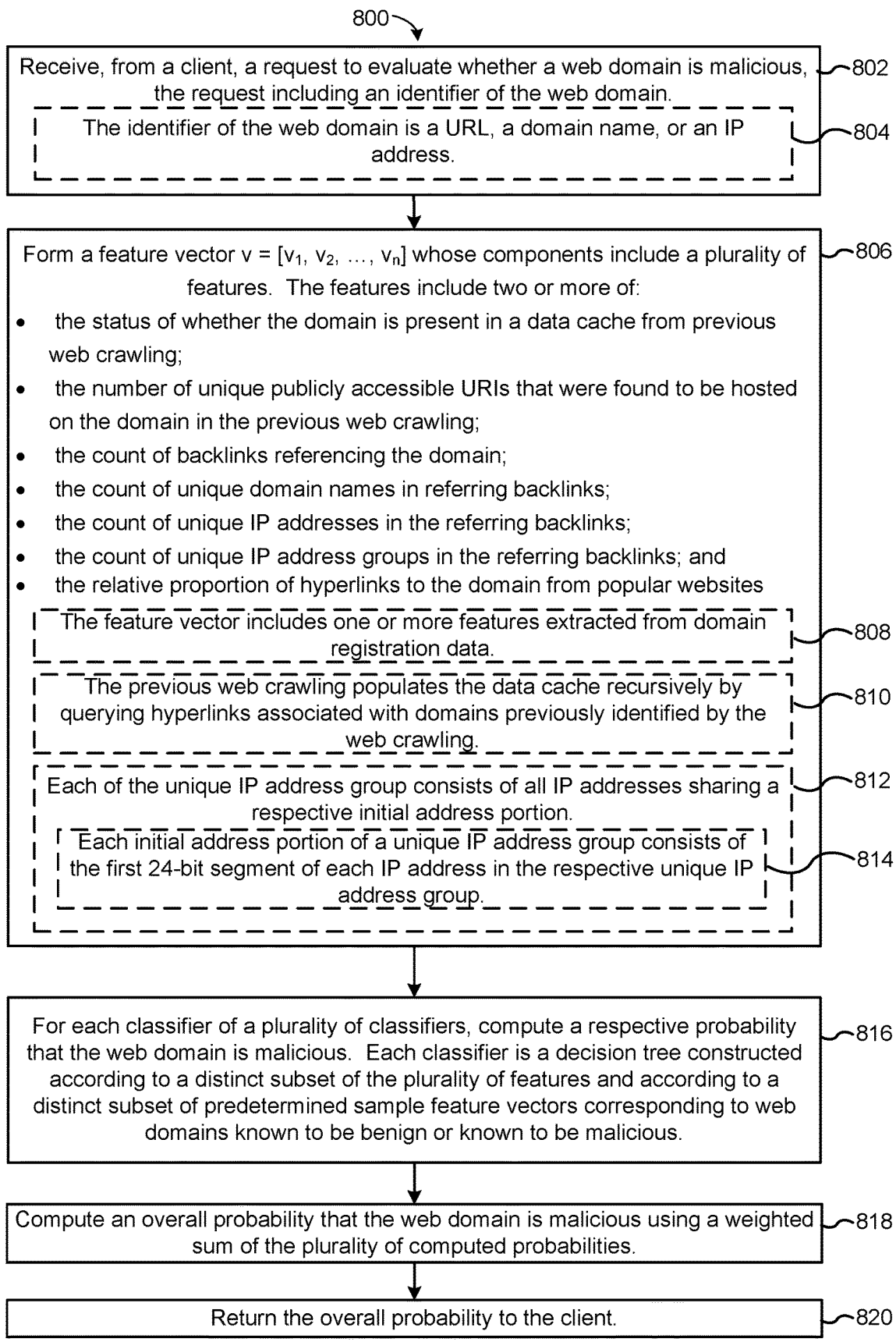
FIG. 8 is a flowchart illustrating a method of classifying domains, in accordance with some implementations.

FIG. 8 is a flowchart illustrating a method 800 of classifying domains, in accordance with some implementations. In some implementations, the method 800 is performed at a computer system (e.g., the domain analysis system 310) having one or more processors (e.g., the one or more processors 402 of the domain analysis system 310) and memory (e.g., the memory 414) storing one or more programs configured for execution by the one or more processors. In some implementations, the method 800 is governed by instructions that are stored in a non-transitory computer readable storage medium. The instructions are executed by one or more processors of the computing system (e.g., the one or more processors 402 of the domain analysis system 310). For convenience, specific operations detailed below are described in relation to the domain analysis system 310.

The domain analysis system 310 receives (802), from a client, a request to evaluate whether a web domain 128 is malicious. The request includes (802) an identifier of the web domain. The identifier of the web domain is (804) typically a URL, a domain name, or an IP address.

The domain analysis system 310 computes (806) a plurality of features for the domain. Sometimes the features are referred to as attributes or characteristics. In some implementations, the features are arranged in a feature vector v. In some implementations, one of the features specifies (806) whether the domain is present in a data cache from previous web crawling. In some implementations, one of the features is (806) the number of unique publicly accessible URIs that were found to be hosted on the domain in the previous web crawling. In some implementations, one of the features is (806) the number of backlinks referencing the domain. In some implementations, one of the features is (806) the number of unique domain names in referring backlinks. In some implementations, one of the features is (806) the number of unique IP addresses in the referring backlinks. In some implementations, one of the features is (806) the number of unique IP address groups in the referring backlinks. In some implementations, one of the features is (806) the relative proportion of hyperlinks to the domain from popular websites.

In some implementations, one of the features is the number of non-unique hyperlinks from a homepage of the domain. Unlike backlinks, the hyperlinks are links from the domain under evaluation to other webpages. Using HTML, hyperlinks are typically enclosed by a pair of tags <a> LINK </a>. In some implementations, the count includes links from other pages as well (i.e., not limited to the homepage). Some hyperlinks are text-based (i.e., the user clicks on text, such as the "Click Here" text-based hyperlink rendered by the HTML code <a href="http://www . . . com">Click Here</a>. Some hyperlinks are image-based (i.e., the use clicks on an image, such as a smiley face image-based hyperlink rendered by the HTML code <a href="http://www . . . com"><img src="smiley.gif" alt="Smiling Face" height="30" width="30"></a>. In some implementations, one of the features is the number of non-unique image-based hyperlinks from the homepage of the domain. In some implementations, one of the features is the number of non-unique text-based hyperlinks from the home page of the domain. In some implementations, one of the features is the number of non-unique hyperlinks, from the home page of the domain, that include the string "https://".

In some versions of HTML, a link on a webpage may advise search engines not to follow the link. This is typically done by including rel="nofollow" within a hyperlink definition. For example, the HTML code <a href="http://www . . . com" rel="nofollow">Click Here</a>tells search engines not to follow the link when web crawling. Hyperlinks or backlinks that are designated as nofollow can be useful for determining whether a domain is benign or malicious. In some implementations, one of the features is the number of non-unique nofollow hyperlinks from the homepage of the domain. In some implementations, one of the features is the number of non-unique nofollow backlinks referencing the domain.

In some implementations, the features count the number of unique hyperlinks or backlinks, instead of, or in addition to, the number of non-unique hyperlinks or backlinks.

In some implementations, one or more of the feature values is obtained from the web crawling cache. In some implementations, the features include (808) one or more features extracted from domain registration data. For example, the features extracted from domain registration data can include one or more of: the domain name, the IP address(es), URL(s), TLD(s), data about the registrant (e.g., name, email address, mailing address, city of residence, country of residence), the registrar, date of domain expiration, date of the latest update, and other information associated with the domain registration record. In some implementations, the domain registration data is obtained from partners of the domain analysis system in a partner data feed 218.

In some implementations, the previous web crawling populates (810) the data cache recursively by querying hyperlinks associated with domains previously identified by the web crawling. For a given domain the number of web hyperlinks that point to the domain forms a feature called "backlinks."

When features for unique IP address groups are used, some implementations define a unique IP address group to consist of (812) of all IP addresses sharing a respective initial address portion. In some implementations, the initial address portion of a unique IP address group consists of (914) the first 24-bit segment of each IP address in the respective unique IP address group.

For each classifier, the domain analysis system 310 computes (816) a respective probability that the web domain is malicious. Each classifier is (816) a respective decision tree constructed according to a respective distinct subset of the plurality of features and according to a respective distinct subset of sample feature vectors corresponding to web domains known to be benign or known to be malicious. In some implementations, the respective subset of the sample feature vectors and the respective subset of the domain features are randomly selected.

The domain analysis system 310 computes (818) an overall probability that the web domain is malicious using a weighted sum of the plurality of computed probabilities. In some implementations, the weights are all the same. In some implementations, the weights are tuned over time based on additional feedback about the domains that were tentatively classified.

In some implementations, the domain analysis system 310 assigns a label of "benign" or "malicious" to each web domain using a predetermined cutoff value. In some implementations, the cutoff value is set at 50%. Depending on whether there is a greater concern for Type I errors or Type II errors, the cutoff value can be adjusted. For example, the cutoff value can be set at a very low percentage (e.g., when the probability is greater than 5%, treat the domain as malicious), or a very high value (e.g., treat a domain as malicious only when the probability is greater than 95%).

The domain analysis system 310 returns (820) the overall probability to the client.

In some implementations, the domain analysis system 310 updates the status of the web domain from unclassified to known in the database 324. In some implementations, the domain analysis system 310 adds the now-classified domain as training data 442 in the database 324. In some implementations, multiple reports of the same domain occur, and the reports are treated separately with the feature vector available at the time of classification.

In some implementations, the domain analysis system 310 notifies the partners about the status update.

In some implementations, when the web domain is identified as malicious, the domain analysis system 310 issues a warning to the client. In some implementations, the domain analysis system 310 prevents the client from accessing the malicious web domain.

Although the predictive models have been described primarily with respect to decision trees, the same feature vectors can be used to build neural networks (NNs) or support vector machines (SVMs) as well. In some of these implementations, a single neural network or support vector machine is constructed based on the sample feature vectors. More commonly in these implementations, the predictive model is based on a plurality of neural networks or SVMs, where each is built based on a distinct subset of features and a distinct subset of the samples.

Some implementations combine a plurality of distinct scoring functions to compute an overall probability that a domain is benign or malicious. In some implementations, all of the scoring functions use the same underlying structure (e.g., all of the scoring functions use decision trees, or all of the scoring functions use neural networks, or all of the scoring functions use support vector machines). However, some implementations use a non-homogenous combination of scoring functions (using a mixture of decision trees, neural networks, and/or support vector machines). Some implementations also use stacked machine learning, where the outputs from one or more scoring functions are used as inputs to other scoring functions or classifiers. Combining multiple distinct scoring functions or classifiers in this way can increase the accuracy of the final result, reduce the variance of the final result, and/or reduce the bias based on the specific sample set.

Although some of the figures illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The terms first and second may be used to describe various elements, but these labels do not necessarily imply order. These terms are used to distinguish one element from another. For example, a first feature could be termed a second feature, and, similarly, a second feature could be termed a first feature, without departing from the scope of the various described implementations. The first feature and the second feature are both features, but they are not the same feature.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the scope of the claims to the precise forms disclosed.

Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for classifying domains, performed at a computer system having a plurality of classifiers, one or more processors and memory storing one or more programs configured for execution by the one or more processors, the method comprising:

receiving, from a client, a request to evaluate whether a web domain is malicious, the request including an identifier of the web domain;

forming a feature vector $v=[v_1, v_2, \ldots, v_n]$ whose components include:

a number of unique publicly accessible URIs that were found to be hosted on the domain in a previous web crawling;
a count of non-unique hyperlinks from a homepage of the domain;
a count of non-unique image-based hyperlinks from the homepage of the domain;
a count of non-unique text-based hyperlinks from the home page of the domain;
a count of non-unique hyperlinks, from a home page of the domain, that include the string "https://";
a count of non-unique nofollow hyperlinks from the homepage of the domain;
a count of non-unique nofollow backlinks referencing the domain; and
a relative proportion of hyperlinks to the domain from websites that are designated as popular based on user access;
for each classifier of the plurality of classifiers, computing a respective probability that the web domain is malicious, wherein each classifier is a respective decision tree constructed according to a respective distinct subset of the plurality of features and according to a respective distinct subset of predetermined sample feature vectors corresponding to web domains known to be benign or known to be malicious;
computing an overall probability that the web domain is malicious using a weighted sum of the plurality of computed probabilities; and
returning the overall probability to the client.

2. The method of claim 1, wherein the identifier of the web domain is selected from the group consisting of a URL, a domain name, and an IP address.

3. The method of claim 1, wherein the feature vector further includes one or more features selected from the group consisting of:
a status of whether the domain is present in a data cache from previous web crawling;
a count of backlinks referencing the domain;
a count of unique domain names in referring backlinks;
a count of unique IP addresses in the referring backlinks; and
a count of unique IP address groups in the referring backlinks.

4. The method of claim 3, wherein each of the unique IP address groups consists of all IP addresses sharing a respective initial address portion.

5. The method of claim 4, wherein each initial address portion of a unique IP address group consists of the first 24-bit segment of each IP address in the respective unique IP address group.

6. The method of claim 1, wherein the previous web crawling populates the data cache recursively by querying hyperlinks associated with domains previously identified by the web crawling.

7. The method of claim 1, wherein the feature vector includes one or more features extracted from domain registration data.

8. An electronic device, comprising:
one or more processors; and
memory storing one or more programs for execution by the one or more processors, the one or more programs including instructions for:
receiving, from a client, a request to evaluate whether a web domain is malicious, the request including an identifier of the web domain;
forming a feature vector $v=[v_1, v_2, \ldots, v_n]$ whose components include:
a number of unique publicly accessible URIs that were found to be hosted on the domain in the previous web crawling;
a count of non-unique hyperlinks from a homepage of the domain;
a count of non-unique image-based hyperlinks from the homepage of the domain;
a count of non-unique text-based hyperlinks from the home page of the domain;
a count of non-unique hyperlinks, from a home page of the domain, that include the string "https://";
a count of non-unique nofollow hyperlinks from the homepage of the domain;
a count of non-unique nofollow backlinks referencing the domain; and
a relative proportion of hyperlinks to the domain from websites that are designated as popular based on user access;
for each classifier of a plurality of classifiers, computing a respective probability that the web domain is malicious, wherein each classifier is a respective decision tree constructed according to a respective distinct subset of the plurality of features and according to a respective distinct subset of predetermined sample feature vectors corresponding to web domains known to be benign or known to be malicious;
computing an overall probability that the web domain is malicious using a weighted sum of the plurality of computed probabilities; and
returning the overall probability to the client.

9. The electronic device of claim 8, wherein the identifier of the web domain is selected from the group consisting of a URL, a domain name, and an IP address.

10. The electronic device of claim 8, wherein the feature vector further includes one or more features selected from the group consisting of:
a status of whether the domain is present in a data cache from previous web crawling;
a count of backlinks referencing the domain;
a count of unique domain names in referring backlinks;
a count of unique IP addresses in the referring backlinks; and
a count of unique IP address groups in the referring backlinks.

11. The electronic device of claim 10, wherein each of the unique IP address groups consists of all IP addresses sharing a respective initial address portion.

12. The electronic device of claim 11, wherein each initial address portion of a unique IP address group consists of the first 24-bit segment of each IP address in the respective unique IP address group.

13. The electronic device of claim 8, wherein the previous web crawling populates the data cache recursively by querying hyperlinks associated with domains previously identified by the web crawling.

14. The electronic device of claim 8, wherein the feature vector includes one or more features extracted from domain registration data.

15. A non-transitory computer-readable storage medium storing one or more programs for execution by one or more processors of an electronic device, the one or more programs including instructions for:
receiving, from a client, a request to evaluate whether a web domain is malicious, the request including an identifier of the web domain;

forming a feature vector $v=[v_1, v_2, \ldots, v_n]$ whose components include:
- a number of unique publicly accessible URIs that were found to be hosted on the domain in the previous web crawling;
- a relative proportion of hyperlinks to the domain from websites that are designated as popular based on user access;
- a count of non-unique image-based hyperlinks from the homepage of the domain;
- a count of non-unique text-based hyperlinks from the home page of the domain;
- a count of non-unique hyperlinks, from a home page of the domain, that include the string "https://";
- a count of non-unique nofollow hyperlinks from the homepage of the domain; and
- a count of non-unique nofollow backlinks referencing the domain;

for each classifier of a plurality of classifiers, computing a respective probability that the web domain is malicious, wherein each classifier is a respective decision tree constructed according to a respective distinct subset of the plurality of features and according to a respective distinct subset of predetermined sample feature vectors corresponding to web domains known to be benign or known to be malicious;

computing an overall probability that the web domain is malicious using a weighted sum of the plurality of computed probabilities; and returning the overall probability to the client.

16. The non-transitory computer-readable storage medium of claim 15, wherein the identifier of the web domain is selected from the group consisting of a URL, a domain name, and an IP address.

17. The non-transitory computer-readable storage medium of claim 16, wherein each of the unique IP address group consists of all IP addresses sharing a respective initial address portion.

18. The non-transitory computer-readable storage medium of claim 17, wherein each initial address portion of a unique IP address group consists of the first 24-bit segment of each IP address in the respective unique IP address group.

19. The non-transitory computer-readable storage medium of claim 15, wherein the previous web crawling populates the data cache recursively by querying hyperlinks associated with domains previously identified by the web crawling.

20. The non-transitory computer-readable storage medium of claim 15, wherein the feature vector includes one or more features extracted from domain registration data.

* * * * *